US009938895B2

(12) United States Patent
Kerth et al.

(10) Patent No.: US 9,938,895 B2
(45) Date of Patent: Apr. 10, 2018

(54) DUAL REHEAT TOPPING CYCLE FOR IMPROVED ENERGY EFFICIENCY FOR COMPRESSED AIR ENERGY STORAGE PLANTS WITH HIGH AIR STORAGE PRESSURE

(71) Applicant: Dresser-Rand Company, Olean, NY (US)

(72) Inventors: Jason M. Kerth, Houston, TX (US); George M. Lucas, Wellsville, NY (US); Stephen S. Rashid, Wellsville, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 849 days.

(21) Appl. No.: 14/078,986

(22) Filed: Nov. 13, 2013

(65) Prior Publication Data
US 2014/0137563 A1 May 22, 2014

Related U.S. Application Data

(60) Provisional application No. 61/728,348, filed on Nov. 20, 2012.

(51) Int. Cl.
*F02C 1/00* (2006.01)
*F02C 6/16* (2006.01)

(52) U.S. Cl.
CPC .............. *F02C 6/16* (2013.01); *Y02E 60/15* (2013.01)

(58) Field of Classification Search
CPC ............. F02C 6/14; F02C 6/16; Y02E 60/15
See application file for complete search history.

(56) References Cited

U.S. PATENT DOCUMENTS 3,704,586 A * 12/1972 Bruns .................. F01K 23/067
60/39.12
3,831,373 A * 8/1974 Flynt ...................... F02C 6/16
290/52

(Continued)

FOREIGN PATENT DOCUMENTS

DE    10 2004 040 890 A1    3/2005
EP         1865249 A2    12/2007
(Continued)

OTHER PUBLICATIONS

Bullough, Chris; Gatzen, Christoph; Jakiel, Christoph; Koller, Martin; Nowi, Andreas, and Zunfit, Stefan, "Advanced Adiabatic Compressed Air Energy Storage for the Integration of Wind Energy", *Proceedings of the European Wind Energy Conference*, EWEC 2004, Nov. 22-25, 2004, London, UK, 8 pages.

(Continued)

*Primary Examiner* — Gerald L Sung (57) ABSTRACT

A method for operating a compressed air energy storage system is provided. The method can include compressing a process gas with a compressor train to produce a compressed process gas and storing the compressed process gas in a compressed gas storage unit. The method can also include extracting the compressed process gas from the compressed gas storage unit to an expansion assembly through a feed line. A valve assembly fluidly coupled to the feed line can be actuated to control a mass flow of the compressed process gas from the compressed gas storage unit to the expansion assembly. The method can further include heating the compressed process gas in a preheater fluidly coupled to the feed line upstream from the expansion assembly, and generating a power output with the expansion assembly.

9 Claims, 3 Drawing Sheets

(56) References Cited

U.S. PATENT DOCUMENTS

| | | | |
|---|---|---|---|
| 4,033,114 A * | 7/1977 | Zaugg | F02C 6/003 60/778 |
| 4,043,120 A * | 8/1977 | Hoffeins | F02C 3/36 60/39.511 |
| 4,158,145 A * | 6/1979 | Kartsounes | F02C 3/28 290/52 |
| 4,237,692 A * | 12/1980 | Ahrens | F02C 3/32 60/652 |
| 4,281,256 A * | 7/1981 | Ahrens | F02C 6/16 290/1 R |
| 4,522,024 A | 6/1985 | Zaugg | |
| 4,630,436 A * | 12/1986 | Frutschi | F02C 3/205 60/39.183 |
| 4,870,816 A | 10/1989 | Nakhamkin | |
| 5,165,239 A | 11/1992 | Bechtel et al. | |
| 5,181,376 A | 1/1993 | Rao | |
| 5,379,589 A | 1/1995 | Cohn et al. | |
| 5,384,489 A | 1/1995 | Bellac | |
| 5,394,686 A | 3/1995 | Child et al. | |
| 5,442,904 A | 8/1995 | Shnaid | |
| 5,448,889 A | 9/1995 | Bronicki | |
| 5,491,969 A | 2/1996 | Cohn et al. | |
| 5,495,709 A | 3/1996 | Frutschi | |
| 5,537,822 A | 7/1996 | Shnaid et al. | |
| 5,632,143 A | 5/1997 | Fisher et al. | |
| 5,634,340 A | 6/1997 | Grennan | |
| 5,660,037 A | 8/1997 | Termuehlen | |
| 5,778,675 A | 7/1998 | Nakhamkin | |
| 5,845,479 A | 12/1998 | Nakhamkin et al. | |
| 5,934,063 A | 8/1999 | Nakhamkin | |
| 6,038,849 A | 3/2000 | Nakhamkin et al. | |
| 6,134,873 A | 10/2000 | Nakhamkin et al. | |
| 6,244,037 B1 | 6/2001 | Nakhamkin et al. | |
| 6,260,269 B1 | 7/2001 | Turnquist et al. | |
| 6,276,123 B1 | 8/2001 | Chen et al. | |
| 6,305,158 B1 | 10/2001 | Nakhamkin et al. | |
| 6,442,941 B1 | 9/2002 | Anand et al. | |
| 6,512,305 B1 | 1/2003 | Pinkerton et al. | |
| 6,637,207 B2 | 10/2003 | Konezciny et al. | |
| 6,694,722 B2 | 2/2004 | Kreitmeier | |
| 6,708,500 B2 | 3/2004 | Huster et al. | |
| 6,715,296 B2 | 4/2004 | Bakran et al. | |
| 6,725,663 B2 | 4/2004 | Bakran et al. | |
| 6,725,665 B2 | 4/2004 | Tuschy et al. | |
| 6,745,569 B2 | 6/2004 | Gerdes | |
| 6,792,756 B2 | 9/2004 | Bakran et al. | |
| 6,792,760 B2 | 9/2004 | Mathias et al. | |
| 6,817,187 B2 | 11/2004 | Yu | |
| 6,848,259 B2 | 2/2005 | Kelller-Sornig et al. | |
| 6,851,265 B2 | 2/2005 | Elwood et al. | |
| 6,901,759 B2 | 6/2005 | Frutschi | |
| 6,901,760 B2 | 6/2005 | Dittmann et al. | |
| 6,920,759 B2 | 7/2005 | Wakana et al. | |
| 6,927,503 B2 | 8/2005 | Enis et al. | |
| 6,931,856 B2 | 8/2005 | Belokon et al. | |
| 6,955,050 B2 | 10/2005 | Perkins et al. | |
| 7,073,335 B2 | 7/2006 | Gerdes et al. | |
| 7,086,231 B2 | 8/2006 | Pinkerton | |
| 7,127,895 B2 | 10/2006 | Pinkerton et al. | |
| 7,150,154 B2 | 12/2006 | Althaus et al. | |
| 7,223,065 B2 | 5/2007 | Suter | |
| 7,325,401 B1 | 2/2008 | Kesseli et al. | |
| 7,389,644 B1 | 6/2008 | Nakhamkin | |
| 7,406,828 B1 | 8/2008 | Nakhamkin | |
| 7,471,010 B1 | 12/2008 | Fingersh | |
| 7,500,349 B2 | 3/2009 | Althaus | |
| 7,503,178 B2 | 3/2009 | Bücker et al. | |
| 7,614,237 B2 | 11/2009 | Nakhamkin | |
| 7,614,239 B2 | 11/2009 | Herzog et al. | |
| 7,640,643 B2 | 1/2010 | Nakhamkin | |
| 7,663,255 B2 | 2/2010 | Kim et al. | |
| 7,669,419 B2 | 3/2010 | Juby et al. | |
| 7,669,423 B2 | 3/2010 | Nakhamkin | |
| 7,677,046 B2 | 3/2010 | Althaus et al. | |
| 7,681,395 B2 | 3/2010 | Pinkerton et al. | |
| 7,692,327 B2 | 4/2010 | Althaus | |
| 7,693,402 B2 | 4/2010 | Hudson et al. | |
| 7,703,271 B2 | 4/2010 | Minkkinen et al. | |
| 7,719,127 B2 | 5/2010 | Bertolotti | |
| 7,721,552 B2 | 5/2010 | Hansson et al. | |
| 7,743,609 B1 | 6/2010 | Brostmeyer | |
| 7,753,646 B1 | 7/2010 | Keck et al. | |
| 7,772,715 B2 | 8/2010 | Wiederhold | |
| 7,784,286 B2 | 8/2010 | Bolis et al. | |
| 7,802,426 B2 | 9/2010 | Bollinger | |
| 7,832,213 B2 | 11/2010 | Carroni et al. | |
| 7,874,036 B2 | 1/2011 | Wong et al. | |
| 7,874,155 B2 | 1/2011 | McBride et al. | |
| 7,900,455 B2 | 3/2011 | Althaus et al. | |
| 7,908,842 B2 | 3/2011 | Eroglu et al. | |
| 7,918,091 B1 | 4/2011 | Perkins et al. | |
| 7,954,330 B2 | 6/2011 | Althaus | |
| 7,963,097 B2 | 6/2011 | Mastronarde | |
| 7,967,036 B2 | 6/2011 | Ding et al. | |
| 8,011,189 B2 | 9/2011 | Nakhamkin | |
| 8,015,812 B1 | 9/2011 | Kesseli et al. | |
| 8,024,928 B2 | 9/2011 | Enis et al. | |
| 8,037,678 B2 | 10/2011 | McBride et al. | |
| 8,042,570 B2 | 10/2011 | Shindo | |
| 8,104,274 B2 | 1/2012 | McBride et al. | |
| 8,117,842 B2 | 2/2012 | McBride et al. | |
| 8,122,718 B2 | 2/2012 | McBride et al. | |
| 8,151,549 B2 | 4/2012 | Sasaki et al. | |
| 8,168,149 B2 | 5/2012 | Gal et al. | |
| 8,171,728 B2 | 5/2012 | Bollinger et al. | |
| 8,176,724 B2 | 5/2012 | Smith | |
| 8,181,451 B2 | 5/2012 | VanderVeen et al. | |
| 8,261,522 B2 | 9/2012 | Coffin et al. | |
| 8,689,566 B1 * | 4/2014 | Coney | F01K 23/103 60/39.5 |
| 2003/0033807 A1 * | 2/2003 | Bakran | F02C 6/16 60/676 |
| 2003/0033809 A1 * | 2/2003 | Konezciny | F02C 6/16 60/772 |
| 2003/0033810 A1 * | 2/2003 | Kreitmeier | F02C 6/14 60/772 |
| 2003/0033812 A1 | 2/2003 | Gerdes et al. | |
| 2003/0033814 A1 * | 2/2003 | Bakran | F02C 6/16 60/778 |
| 2003/0037547 A1 * | 2/2003 | Bakran | F02C 6/16 60/659 |
| 2003/0131599 A1 | 7/2003 | Gerdes | |
| 2005/0109034 A1 * | 5/2005 | Althaus | F02C 6/16 60/772 |
| 2005/0178114 A1 | 8/2005 | Althaus et al. | |
| 2005/0268594 A1 | 12/2005 | Kurihara et al. | |
| 2005/0275225 A1 | 12/2005 | Bertolotti | |
| 2006/0213183 A1 | 9/2006 | Althaus | |
| 2007/0095069 A1 | 5/2007 | Joshi et al. | |
| 2007/0234749 A1 | 10/2007 | Enis et al. | |
| 2008/0178601 A1 | 7/2008 | Nakhamkin | |
| 2008/0178602 A1 | 7/2008 | Nakhamkin | |
| 2008/0196429 A1 | 8/2008 | Petrenko et al. | |
| 2008/0236168 A1 | 10/2008 | Carroni et al. | |
| 2008/0272597 A1 | 11/2008 | Althaus | |
| 2009/0100835 A1 | 4/2009 | Nakhamkin | |
| 2009/0178384 A1 | 7/2009 | Nakhamkin | |
| 2009/0230696 A1 | 9/2009 | Enis et al. | |
| 2009/0282840 A1 | 11/2009 | Chen et al. | |
| 2010/0043437 A1 | 2/2010 | Nakhamkin | |
| 2010/0251712 A1 | 10/2010 | Nakhamkin | |
| 2010/0287943 A1 * | 11/2010 | McMahan | F01D 25/002 60/772 |
| 2011/0016864 A1 | 1/2011 | Wright et al. | |
| 2011/0030332 A1 | 2/2011 | Vandor | |
| 2011/0094230 A1 * | 4/2011 | Finkenrath | F02C 1/02 60/727 |
| 2011/0094231 A1 | 4/2011 | Freund | |
| 2011/0097225 A1 * | 4/2011 | Freund | F02C 1/02 417/423.5 |

(56) References Cited

U.S. PATENT DOCUMENTS

| | | | |
|---|---|---|---|
| 2011/0100010 A1 | 5/2011 | Freund et al. | |
| 2012/0151961 A1 | 6/2012 | Ha et al. | |
| 2013/0001948 A1* | 1/2013 | Lim | F02C 6/16 290/52 |

FOREIGN PATENT DOCUMENTS

| | | |
|---|---|---|
| JP | H 10238732 A | 9/1998 |
| RU | 2029119 C1 | 2/1995 |
| WO | 96/38656 A1 | 12/1996 |
| WO | WO 2007/124592 A1 | 11/2007 |
| WO | WO 2008/091502 A2 | 7/2008 |
| WO | WO 2011/163456 A1 | 12/2011 |
| WO | WO 2012/021285 A2 | 2/2012 |
| WO | 2014081690 A1 | 5/2014 |

OTHER PUBLICATIONS

CAES Working Group, "An Answer to Energy Storage", *Dresser-Rand, Steam Turbine, Motor & Generator Division*, Wellsville, NY, 6 pages.

De Biasi, Victor, "Fundamental analysis to optimize adiabatic CAES plant efficiencies," *Gas Turbine World*, Sep.-Oct. 2009, 3 pages.

Dresser-Rand, "SMARTCAES Power Generation Mode PFD Configuration—Topping Cycle/Split Train," Drawing (Apex-2300 PSIA), *Dresser-Rand: Turbo Products Division*, Olean, NY, Apr. 4, 2012, 1 page.

EPRI CAES Working Group, "Compressed Air Energy Storage Turbomachinery", *Dresser-Rand, Steam Turbine, Motor & Generator Division*, Oct. 1988, Wellsville, NY, 6 pages.

Grennan, Charles W., "Cogeneration with Compressed Air Energy Storage," Dresser-Rand, STMG: TB-93-4, faxed on Dec. 21, 1993, 5 pages.

Kidd, H. Allan, "Adiabatic Caes Concept: ARPAe Grant Supporting Information", Mar. 19, 2010, 17 pages.

Lund, Henrik, "Large-scale integration of wind power into different energy systems", *Department of Development and Planning, Aalborg University*, Feb. 28, 2004, Aalborg, Denmark, 11 pages.

PCT/US2009/048077—Notification of Transmittal of International Search Report and Written Opinion of the International Searching Authority, International Search Report and Written Opinion of International Searching Authority, dated Aug. 17, 2009, 10 pages.

PCT/US2009/048080—Notification of Transmittal of International Search Report and Written Opinion of the International Searching Authority, International Search Report and Written Opinion of International Searching Authority, dated Aug. 20, 2009, 8 pages.

PCT/US2009/048082—Notification of Transmittal of International Search Report and Written Opinion of the International Searching Authority, International Search Report and Written Opinion of International Searching Authority, dated Aug. 17, 2009, 7 pages.

PCT/US2010/054382—Notification of Transmittal of International Search Report and Written Opinion of the International Searching Authority, International Search Report and Written Opinion of International Searching Authority, dated Dec. 17, 2010, 8 pages.

PCT/US2011/045275—International Search Report and Written Opinion of International Searching Authority, dated Feb. 23, 2012, 8 pages.

PCT/US2013/070702—International Preliminary Report on Patentability, dated May 26, 2016, 6 pages.

PCT/US2013/070702—International Search Report and Written Opinion of the International Searching Authority, dated Feb. 26, 2014, 11 pages.

EP13856918.1—Extended European Search Report, dated Jun. 16, 2014, 10 pages.

* cited by examiner

DUAL REHEAT TOPPING CYCLE FOR IMPROVED ENERGY EFFICIENCY FOR COMPRESSED AIR ENERGY STORAGE PLANTS WITH HIGH AIR STORAGE PRESSURE

This application claims priority to U.S. Provisional Patent Application having Ser. No. 61/728,348, which was filed Nov. 20, 2012. This priority application is hereby incorporated by reference in its entirety into the present application to the extent consistent with the present application.

BACKGROUND

The present disclosure relates to systems and methods for compressed air energy storage (CAES), and more particularly to improving efficiency for CAES plants with high air storage pressures.

Figure 1:
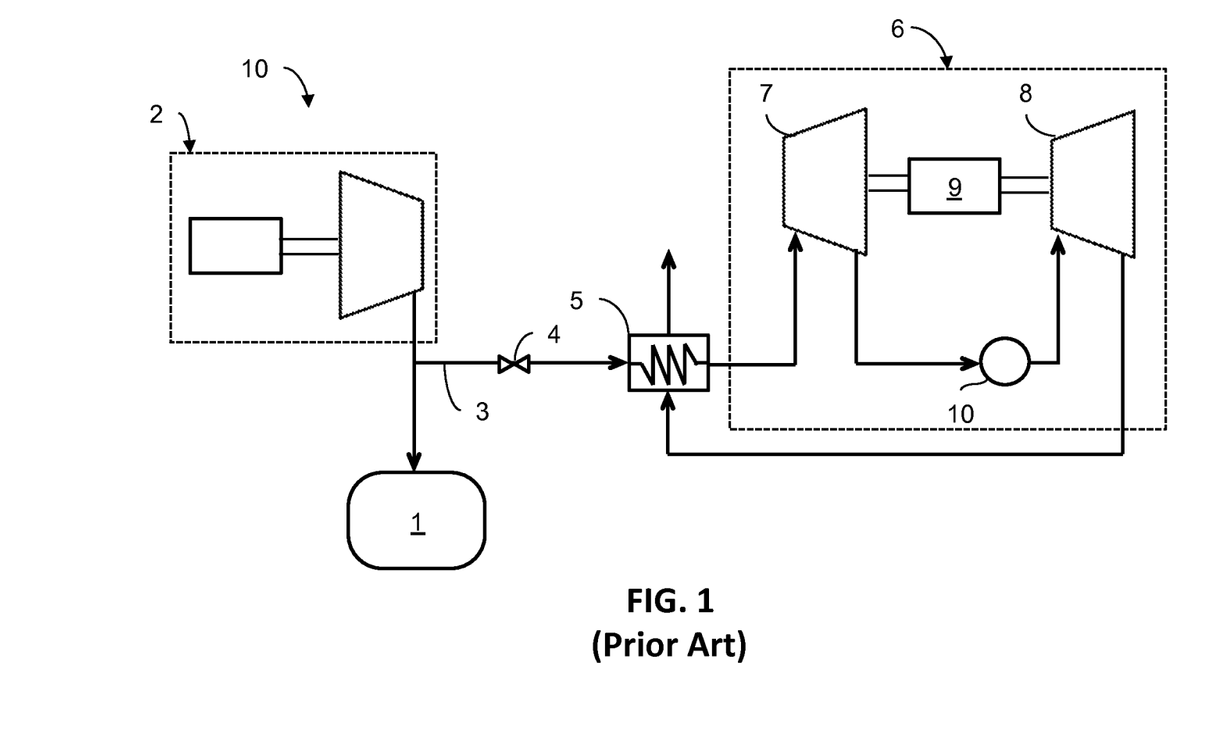
FIG. 1 depicts a schematic of a typical CAES system utilizing a throttling valve according to the prior art.

A typical CAES system 10, shown in FIG. 1, may include a cavern or air storage 1, which stores air compressed by a compressor train 2 to a pressure of about 800 to 1200 psia. A feed line 3 directs the compressed air from the cavern or air storage 1 to a means for throttling 4, often a valve assembly, which reduces the pressure of the compressed air to about 800 psia. The feed line 3 then directs the compressed air to a heat exchanger or recuperator 5, where the compressed air is preheated, and then directed to an expansion assembly 6. The expansion assembly 6 may include an unfired expander or air expander 7, a fired expander 8, and a generator 9. The compressed air may be expanded in the air expander 7 to a reduced pressure. The expanded compressed air may then be directed to a combustor 10 coupled to the fired expander 8, where the expanded compressed air may be mixed with a fuel and burned before further expansion in the fired expander 8. Exhaust gases from the fired expander 8 of the expansion assembly 6 then pass through the recuperator 5 to preheat the compressed air from the cavern 1.

The Energy Ratio represents a measure of performance for a CAES system, which is the ratio of Specific Power Consumption for the compressors (kWhr/lb of air) over Specific Air Consumption for the expanders (lb of air/kWhr). A lower Energy Ratio indicates lower total energy consumption and higher efficiency for the CAES system. A typical CAES system may have an Energy Ratio of approximately 0.75 or lower. However, in some sites for prospective CAES projects, geological constraints, such as deep storage strata, are imposed on the cavern or air storage. In these scenarios, a high storage pressure (e.g., storage pressures exceeding 2000 psia) must be maintained to prevent the collapse of the cavern 1. Compression and storage of air at these high pressures require expending more energy per unit of air stored. Further, the high storage pressure requirements may exceed a maximum designed inlet pressure for the expansion assembly 6, thereby preventing the expansion assembly 6 from directly utilizing the stored air. Thus, a throttling process may be utilized to reduce the high storage pressure to a pressure within the maximum designed inlet pressure of the expansion assembly 6 (e.g., approximately 900 psia). As depicted in FIG. 1, the throttling process may involve venting air through the valve assembly 4 to reduce the high storage pressure. However, this throttling process results in a reduction of efficiency through a loss of potential energy due to the drop in pressure in the valve assembly 4 and/or a loss of thermal energy contributed by the compressor train 2 when compressing air to these high storage pressures. The combination of the higher energy required to compress and store the air at the high storage pressure to maintain the cavern with the energy loss through the throttling process represents a major source of decreased efficiency for prospective CAES projects (e.g., Energy Ratios exceeding 0.90).

It is therefore desirable to find improved CAES systems and methods offering higher efficiencies through recapturing energy typically lost through the throttling process.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for operating a compressed air energy storage system is provided. The method can include compressing a process gas with a compressor train to produce a compressed process gas. The compressed process gas can be stored in a compressed gas storage unit. The compressed gas can be extracted from the compressed gas storage unit through a feed line to an expansion assembly. A valve assembly can be fluidly coupled to the feed line upstream of the expansion assembly and downstream from the compressed gas storage unit. The valve assembly can be actuated to control a mass flow from the compressed gas storage unit to the expansion assembly. The compressed process gas can be heated in a preheater coupled to the feed line upstream from the expansion assembly. A power output can be generated with the expansion assembly including a rotor shaft, a generator coupled to the rotor shaft, an air turbine assembly coupled to the rotor shaft, and a gas turbine assembly coupled to the rotor shaft.

A compressed air energy storage system is provided. The compressed air energy storage system can include a compressor train adapted to receive a process gas and output a compressed process gas. A compressed gas storage unit can be coupled to the compressor train and can receive, store, and output the compressed process gas. A preheater can be coupled to the compressed gas storage unit through a feed line and can be adapted to receive the compressed process gas and heat the compressed process gas from the compressed gas storage unit. An expansion assembly can be coupled to the preheater through the feed line and can be adapted to receive the compressed process gas from the preheater. The expansion assembly can include a rotor shaft, a generator coupled to the rotor shaft adapted to generate a power output, an air turbine assembly coupled to the preheater, and a gas turbine assembly coupled to the air turbine assembly and the preheater. The air turbine assembly can include one or more air expanders coupled to the rotor shaft. The air expanders can expand the compressed process gas and reduce a pressure of the compressed process gas. The gas turbine assembly can receive the compressed process gas and output an exhaust gas. The gas turbine assembly can include a plurality of fired expanders coupled to the rotor shaft. Each of the fired expanders can include a combustor. A valve assembly including one or more valves can be fluidly coupled to the feed line. The valve assembly can control a total mass flow of the compressed process gas from the compressed gas storage unit to the expansion assembly. A bypass line can be coupled to the feed line upstream the air turbine assembly. The bypass line can include a bypass control valve adapted to control a mass flow of the compressed process gas through the air turbine assembly and the bypass line, and the total mass flow to the gas turbine assembly.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
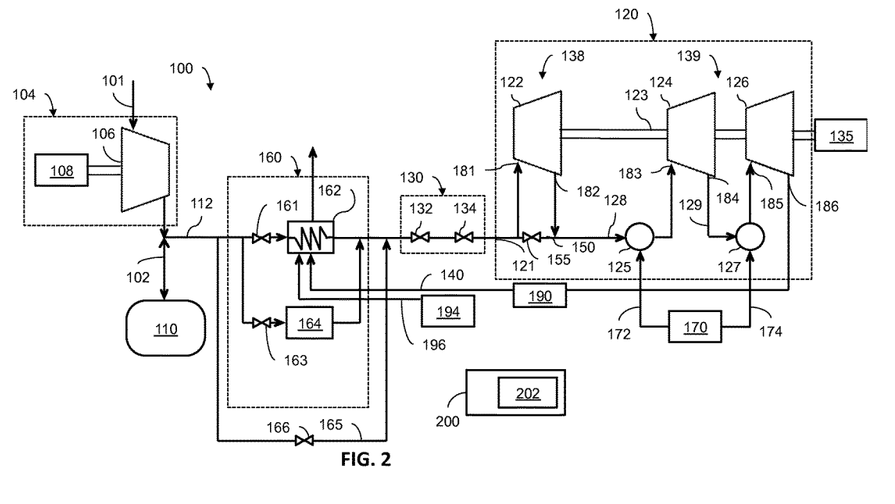
FIG. 2 depicts a schematic of a dual reheat topping cycle for improved energy efficiency for a CAES system with a high storage pressure, according to one or more embodiments described herein.

FIG. 2 depicts a schematic of a dual reheat topping cycle for improved efficiency for a CAES system 100 with a high storage pressure, according to one or more embodiments described herein. The CAES system 100 may include a compressor train 104 including one or more compressors (one is shown 106) configured to compress a process gas. In at least one embodiment, the process gas may be ambient air. The compressors 106 may be supersonic compressors, centrifugal compressors, axial flow compressors, reciprocating compressors, rotating screw compressors, rotary vane compressors, scroll compressors, diaphragm compressors, or the like. The compressor train 104 may further include one or more drivers (one is shown 108) coupled to and adapted to drive the one or more compressors 106 of the compressor train 104. The drivers 108 may be electric motors, turbines, or any other device known in the art to drive the compressors 106. In at least one embodiment, the drivers 108 and compressors 106 may be disposed together in a hermetically sealed casing (not shown). For example, at least one of the drivers 108 and compressors 106 may include a DATUM® centrifugal compressor unit commercially available from Dresser-Rand of Houston, Tex. In another embodiment, at least one of the compressors 106 may include Rampressor™ compressors developed by Ramgen Power Systems, LLC of Bellevue, Wash.

During off-peak hours, the compressor train 104 may compress the process gas, and the compressed process gas may be directed through a line 102 and stored in a compressed gas storage unit 110. In at least one embodiment, the compressed gas storage unit 110 may be a cavern or a vessel. For example, the compressed gas storage unit 110 may be a rock cavern, a salt cavern, an aquifer, an abandoned mine, a depleted gas field, a container stored underwater or above ground, or the like. However, other compressed gas storage units 110 are contemplated herein. The cavern may include one or more constraints that require storage pressures that exceed typical storage pressures (e.g., 800 psia to 1200 psia).

A feed line 112 may provide fluid communication from the compressed gas storage unit 110 to an inlet 121 of an expansion assembly 120. The expansion assembly 120 may include an air turbine assembly 138 and/or a gas turbine assembly 139 coupled to one or more rotor shafts 123. A generator 135 may be coupled to each of the rotor shafts 123 of the expansion assembly 120 and may be driven by the air turbine assembly 138 and/or the gas turbine assembly 139 to generate and supply power to an electrical grid. In at least one embodiment, the generator 135 may be matched to the rated output from the expansion assembly 120. In another embodiment, the air turbine assembly 138 and a first generator (not shown) may be coupled to a first rotor shaft (not shown) and the gas turbine assembly 139 and a second generator (not shown) may be coupled to a second rotor shaft, thereby separating the generation of power from the air turbine assembly 138 and the gas turbine assembly 139.

The air turbine assembly 138 and the gas turbine assembly 139 may each include one or more expanders 122, 124, 126. The expanders 122, 124, 126 of the expansion assembly 120 may be characterized as an air expander or a fired expander. The expanders 122, 124, 126 may further be characterized as high-pressure expanders or low-pressure expanders. One or more lines 128, 129 may provide fluid communication between an outlet 182, 184, 186 and an inlet 181, 183, 185 of the one or more expanders 122, 124, 126. An exhaust line 140 may also be coupled to the outlet 182, 184, 186 of the one or more expanders 122, 124, 126 and may be configured to vent an exhaust gas to atmosphere or direct the exhaust gas to preheat the compressed process gas.

The air turbine assembly 138, depicted in FIG. 2, includes an air expander 122 with an inlet 181 fluidly coupled to the compressed gas storage unit 110 through the feed line 112, and an outlet 182 fluidly coupled to the gas turbine assembly 139 via the combustor 125 through line 128. The air expander 122 may include one or more stages. The air expander may be characterized as a high-pressure air expander and may be adapted to receive compressed process gas over a broad pressure range. For example, in one embodiment, the air expander 122 may receive compressed process gas from a low of about 1200 psia, about 1500 psia, about 1800 psia, or about 2000 psia, to a high of about 2200 psia, 2700 psia, about 3000 psia, or about 3300 psia. The air expander 122 may also be configured to output the compressed process gas at a pressure within a maximum inlet pressure of the gas turbine assembly 139. For example, in at least one embodiment, the designed inlet pressure of the gas turbine assembly 139 may have a maximum of about 700 psia, about 800 psia, or about 900 psia.

In at least one embodiment, the air expander 122 may further include an inlet or injection point (not shown) corresponding to each of the one or more stages. Each of the inlets may be fluidly coupled to the feed line 112 through one or more inlet lines (not shown). The inlet lines (not shown) may further include one or more valves (not shown) configured to control a mass flow of compressed process gas therethrough. In one embodiment, the valves may be actuated to allow compressed process gas to expand through the entire air expander 122, and thus utilize all the one or more stages. In another embodiment, the valves may be actuated to allow compressed process gas to expand through a portion of the air expander 122, thereby circumventing one or more stages of the air expander 122. In at least one embodiment, the arrangement of the valves may be determined by the pressure of the compressed process gas in the feed line 112 upstream of the expansion assembly 120.

The gas turbine assembly 139 may include one or more fired expanders 124, 126. The fired expanders 124, 126 may each include a combustor 125, 127 fluidly coupled to the lines 128, 129 upstream from an inlet 183, 185 of the respective fired expanders 124, 126. The combustors 125, 127 may be configured to receive compressed process gas, mix the compressed process gas with a fuel, and subsequently burn the mixture to produce a combustion product. The combustors 125, 127 may be characterized as a high-pressure combustor or a low-pressure combustor. The high-pressure combustor may include a designed inlet pressure and/or a designed mass flow rate. Providing a pressure or mass flow of compressed process gas to the high-pressure combustor at or near the designed inlet pressure or mass flow rate may allow a higher efficiency for the CAES system 100. In at least one embodiment, the high-pressure combustor has a designed inlet pressure from a low of about 700 psia, about 800 psia, or about 850 psia to a high of about 900 psia, about 950 psia, or about 1050 psia. In another embodiment, the high-pressure combustor has a designed mass flow rate from a low of about 300 lbs/sec, about 350 lbs/sec, or about 400 lbs/sec to a high of about 400 lbs/sec, about 450 lbs/sec, or about 500 lbs/sec.

FIG. 2 depicts the gas turbine assembly 139 including a high-pressure fired expander 124, and a low-pressure fired expander 126 coupled to the rotor shaft 123, wherein a line 129 fluidly couples an exhaust outlet 184 of the high-pressure fired expander 124 to an inlet 185 of the low-pressure fired expander 126 via the combustor 127. A high-pressure combustor 125 associated with the high-pressure expander 124 is fluidly coupled to line 128 and a low-pressure combustor 127 associated with the low-pressure expander 124 is fluidly coupled to line 129. The gas turbine assembly 139 depicted in FIG. 2 may also be capable of a dual reheat, or sequential combustion cycle. During sequential combustion, excess compressed process gas may be introduced to the high-pressure combustor 125 via line 128 and burned with a first portion of fuel to produce a first combustion product. The first combustion product may be expanded in the high-pressure expander 124 to produce a first exhaust product. The first exhaust product may then be exhausted into the low-pressure combustor 127 via line 129. The first exhaust product may then be burned with a second portion of fuel in the low-pressure combustor 127 to consume the excess process gas and produce a second combustion product which may be expanded in the low-pressure expander 126 to produce a second exhaust product. The second exhaust product may then be directed to the exhaust line 140.

A valve assembly 130 may be fluidly coupled to the feed line 112 downstream from the compressed gas storage unit 110 and upstream from the expansion assembly 120 and may control a mass flow rate of the compressed process gas therethrough. The valve assembly 130 may include one or more valves (two are shown 132, 134) and may be arranged in series, in parallel, or any combination thereof. For example, the valve assembly 130 may include three valves, wherein a first valve is arranged in series to a second valve, and the first and second valves are arranged in parallel to a third valve. In at least one embodiment, depicted in FIG. 2, the valve assembly 130 includes a first valve 132 arranged in series to a second valve 134

The one or more valves 132, 134 of the valve assembly 130 may be an emergency stop or trip valve, a control valve, and/or a valve with functions of both an emergency stop valve and a control valve. For example, at least one or more valves may include a Gimpel® trip valve commercially available from Dresser-Rand. In at least one embodiment, depicted in FIG. 2, the first valve 132 is an emergency stop valve and the second valve 134 is a Motive Air Control Valve (MACV), wherein the emergency stop valve 132 is upstream from the MACV 134. In one embodiment, the MACV 134 may be capable of providing control over the mass flow rate of compressed process gas from the compressed gas storage unit 110 to the expansion assembly 120. For example, the MACV 134 may be a fast-acting control valve with trip characteristics that allow it to provide fine control at low mass flow rates during startup and synchronizing processes. The MACV 134 may concurrently be capable of providing an adequate response to high mass flow rates during load control, frequency control, and regulation service processes.

A bypass line 150 may fluidly couple the feed line 112 upstream of the air turbine assembly 138 and downstream from the valve assembly 130 to line 128 upstream of the high-pressure combustor 125. The bypass line may include a bypass control valve 155 configured to control the mass flow of process gas therethrough. The bypass control valve 155 may be adjusted to one or more positions to control the mass flow of the process gas within the bypass line 150 and/or the feed line 112 during one or more modes of operation described herein. In at least one position, the bypass control valve 155 may allow at least a portion of the compressed process gas upstream of the air turbine assembly 138 to flow through the bypass control valve 155 and through the bypass line 150, thereby allowing the portion of the compressed process gas to circumvent the air turbine assembly 138 and flow directly to the high-pressure combustor 125 of the gas turbine assembly 139. In another position, the bypass control valve 155 may prevent all or substantially all of the process gas upstream of air turbine assembly 138 from flowing through the bypass line 150, thereby directing all or substantially all the compressed process gas to the air turbine assembly 138. The bypass control valve 155 may also allow all or substantially all of the process gas upstream of air turbine assembly 138 to flow through the bypass line 150, thereby directing all or substantially all the compressed process gas away from the air turbine assembly 138.

In one or more embodiments, the bypass control valve 155 may be modulated or controlled to regulate a total mass flow. The total mass flow may be measured by the sum of a mass flow through the air turbine assembly 138 and a mass flow through the bypass line 150. Regulating the total mass flow may also allow the bypass control valve 155 to regulate an inlet pressure for the gas turbine assembly 139. In at least one embodiment, the bypass control valve 155 may be modulated to regulate and/or maintain the total mass flow or designed inlet pressure to match a designed mass flow or designed inlet pressure for the gas turbine assembly 139. When the total mass flow or inlet pressure matches the designed mass flow or inlet pressure for the gas turbine assembly 139, total power output and energy efficiency for the CAES system 100 may be optimized. In at least one embodiment, the bypass control valve 155 and the valve assembly 130 may be actuated in concert to control the total mass flow to the gas turbine assembly 139.

A preheater 160 may be fluidly coupled to the feed line 112 downstream from the compressed gas storage unit 110 and upstream of the expansion assembly 120. The preheater 160 may be configured to heat compressed process gas before the compressed process gas is directed to the expansion assembly 120. As shown in FIG. 2, the preheater 160 may include a recuperator 162 fluidly coupled to the exhaust gas line 140 and configured to transfer thermal energy between the compressed process gas from the compressed gas storage unit 110 and the exhaust gas from the gas turbine assembly 139.

In another embodiment, the preheater may include an electrical heater, a gas heater, or standby heater 164 configured to transfer thermal energy to the compressed process gas. The standby heater 164 may also be a separate and distinct system from the preheater 160, and may be configured to receive compressed process gas from an external or auxiliary source. The standby heater 164 can be used to maintain the temperature of one or more components of the CAES system 100 during one or more modes of operation. For example, in at least one embodiment, the standby heater 164 may be used during a standby mode to maintain the temperature of the expansion assembly 120 or components thereof. Maintaining the temperature of the expansion assembly 120 can include maintaining the temperature of the expansion assembly 120 or components thereof at about the operating temperatures. Maintaining the temperature of the expansion assembly 120 can facilitate and/or increase the reliability of one or more modes of operation, including, but not limited to, the starting and loading of the expansion assembly 120. Maintaining the temperature may also minimize thermo-mechanical strain, which may shorten the service life of one or more components of the expansion assembly 120.

The preheater 160 may further include one or more valves 161, 163 fluidly coupled to the feed line 112 upstream of the recuperator 162 and/or the standby heater 164 to control mass flow of the compressed process gas therethrough. The one or more valves 161, 163 may be adjusted independently or in concert to control the mass flow of the compressed process gas through the recuperator 162, the standby heater 164, and/or the feed line 112 during one or more modes of operation described herein. A preheater bypass line 165 may fluidly couple the feed line 112 upstream of the preheater 160 to the feed line 112 downstream from the preheater 160. The preheater bypass line 165 may include a preheater bypass valve 166 configured to control mass flow therethrough.

In at least one embodiment, the preheater 160 may include the recuperator 162 and the standby heater 164 arranged in the feed line 112 either in series or in parallel. The preheater 160 in FIG. 2 includes the recuperator 162 and the standby heater 164 arranged in parallel, wherein a first valve 161 is fluidly coupled to the feed line 112 upstream of the recuperator and a second valve 163 is fluidly coupled to the feed line 112 upstream of the standby heater 164. The first valve 161 may control the mass flow to the recuperator 162 or mass flow diverted away from the recuperator 162. The second valve 163 may control the mass flow to the standby heater 164 or mass flow diverted away from the standby heater 164. In another embodiment, the first and second valves 161, 163 may be modulated in concert to control the mass flow through the recuperator 162 and the standby heater 164. In at least one embodiment, the mass flow through the preheater 160 and/or the temperature of the preheater 160 may be determined, at least in part, by the temperature of the expansion assembly 120 or components thereof.

The CAES system 100 may further include a water injection skid 170 configured to introduce water or water vapor into one or more components or assemblies of the CAES system 100. The introduction of water or water vapor may serve to reduce the production of emissions in the CAES system 100. The water injection skid 170 may be coupled to the CAES system 100 via one or more lines 172, 174. In at least one embodiment, the water injection skid 170 may introduce water into the CAES system 100 upstream of the combustors 125, 127 of the gas turbine assembly 139. In another embodiment, the water injection skid 170 may introduce water directly to the combustors 125, 127 of the gas turbine assembly 139 via lines 172, 174. The water injected upstream of the combustors 125, 127 may be evaporated in the combustors 125, 127 to produce water vapor. The water vapor may then be mixed with the process gas and fuel in the combustors 125, 127. FIG. 2 shows the water injection skid 170 fluidly coupled to the high-pressure combustor 125 and the low-pressure combustor 127 through a first and second line 172, 174, respectively. The injection of water or water vapor may serve to reduce the production of NOx emissions in the CAES system 100.

An emission abatement system 190 may be configured to reduce emissions in the CAES system 100. The emission abatement system 190 may include a selective catalytic reduction (SCR) catalyst. The SCR catalyst may reduce the emission of NOx to the atmosphere through a reduction process, thereby producing inert nitrogen and water. In at least one embodiment, the emission abatement system 190 may be coupled to line 140 and interposed between the outlet 186 of the low-pressure fired expander 126 and the recuperator 162. The CAES system 100 may also include an ammonia injection skid 194. The ammonia injection skid 194 may be configured to provide a flow of aqueous ammonia or an ammonia based reductant upstream of the recuperator 162 via a line 196 to reduce NOx emissions. In at least one embodiment, the ammonia injection skid 194 may reduce the presence of nitrogen oxides (NOx) and/or reduce the emission of NOx to the atmosphere.

In operation, process gas may be introduced to the compressor 106 of the compressor train 104 via line 101. In at least one embodiment, the process gas in line 101 may have a pressure between about 10 psia and about 20 psia, a temperature between about 40° F. and about 110° F., and a flow rate between about 370 lbs/sec and about 470 lbs/sec. In another embodiment, the flow rate could be between about 25 lbs/sec and about 100 lbs/sec. For example, the process gas in line 101 may have a pressure of about 13.9 psia, a temperature of about 46° F., and a flow rate of about 415 lbs/sec. The compressor train 104 may compress the process gas and output the compressed process gas in line 102.

The process gas in line 102 may be introduced to and stored in the compressed gas storage unit 110 during off-peak hours. In at least one embodiment, the process gas in line 102 may have a pressure between about 1300 psia and about 1700 psia and a temperature between 70° F. and 100° F. For example, the process gas in line 102 may have a pressure of about 1500 psia and a temperature of 85° F. In another embodiment, the process gas in line 102 may have a pressure from a low of about 1500 psia, about 2000 psia, or about 2300 psia to a high of about 2600 psia, about 3000 psia, or greater than 3000 psia.

During peak hours, the process gas may be drawn from the compressed gas storage unit 110 through the feed line 112 and used to generate a power output through the expansion assembly 120. Prior to being introduced to the expansion assembly 120, the compressed process gas may be directed to the recuperator 162 via the feed line 112. The compressed process gas drawn from the compressed gas storage unit 110 upstream of the recuperator 162 may have a pressure from a low of about 1500 psia, about 2000 psia, or about 2300 psia to a high of about 2600 psia, about 3000 psia, or greater than 3000 psia. The compressed process gas drawn from the compressed gas storage unit 110 upstream of the recuperator 162 may have a temperature from a low of about 60° F., about 80° F., or about 85° F., to a high of about 95° F., about 105° F., or about 115° F. The recuperator 162 may transfer heat from the exhaust gas of the gas turbine assembly 139 to the compressed process gas to preheat the compressed process gas. The recuperator 162 may heat the compressed process gas to a low of about 500° F., about 600° F., or about 700° F. to a high of about 700° F., about 800° F., or about 900° F.

The compressed process gas may then be transported from the recuperator 162 through the feed line 112 and the valve assembly 130, to the inlet 121 of the expansion assembly 120, where a portion of the compressed process gas may be directed through the bypass line 150 directly to the high-pressure combustor 125 or through the air expander 122 of the air turbine assembly 138. The compressed process gas may then be expanded in the air expander 122, thereby reducing the pressure of the process gas and concurrently producing a first power output in the generator 135. In at least one embodiment, the expansion of the process gas in the air expander 122 may produce approximately 25 MW of energy in the generator 135. The expanded process gas may then be directed through the line 128 to the high-pressure combustor 125 of the gas turbine assembly 139. In at least one embodiment, the process gas in line 128, upstream of the high-pressure combustor 125, may have a pressure from a low of about 700 psia, about 800 psia, or about 850 psia to a high of about 900 psia, about 950 psia, or about 1050 psia. For example, the expanded process gas from the air expander 122 in line 128 may have a pressure of 875 psia. In at least one embodiment, the expanded process gas in line 128, upstream of the high-pressure combustor 125, may be within the designed maximum inlet pressure of the high-pressure combustor 125. In one embodiment, the process gas in line 128, upstream of the high-pressure combustor 125, may have a temperature from a low of about 300° F., about 400° F., or about 500° F. to a high of about 400° F., about 500° F., or about 600° F. For example, the process gas in line 128, upstream of the high-pressure combustor 125 may have a temperature of about 435° F.

The process gas in line 128 may then be combined with a first portion of fuel and combusted in the high-pressure combustor 125 to produce a first combustion product prior to being introduced to the high-pressure expander 124. In one embodiment, the first combustion product may have a temperature from a low of about 900° F., about 1000° F., or about 1100° F. to a high of about 1000° F., about 1100° F., or about 1200° F. The first combustion product may have a pressure from a low of about 700 psia, about 800 psia, or about 850 psia to a high of about 900 psia, about 950 psia, or about 1050 psia. The first combustion product may then be expanded through the high-pressure expander 124, thereby reducing the pressure of the first combustion product and concurrently producing a second power output in the generator 135. In at least one embodiment, the high-pressure expander 124 may expand the first combustion product and exhaust a first exhaust product to generate approximately 36 MW of energy in the generator 135. The first exhaust product may then flow through line 129 to the low-pressure combustor 127. In at least one embodiment, the first exhaust product in line 129, upstream of the low-pressure combustor 127, may have a pressure from a low of about 150 psia, about 200 psia, or about 250 psia to a high of about 300 psia, about 350 psia, or about 400 psia. In at least one embodiment, the first exhaust product in line 129, upstream of the low-pressure combustor 127, may be within the maximum designed inlet pressure of the low-pressure combustor 127. In one embodiment, the first exhaust product in line 129, upstream of the low-pressure combustor 127, may have a temperature from a low of about 500° F., about 600° F., or about 650° F. to a high of about 700° F., about 750° F., or about 800° F.

The first exhaust product in line 129 may then be combined with a second portion of fuel and combusted in the low-pressure combustor 127 to produce a second combustion product prior to being introduced to the low-pressure expander 126. In one embodiment, the second combustion product may have a temperature from a low of about 1400° F., about 1500° F., or about 1550° F. to a high of about 1650° F., about 1700° F., or about 1800° F. The second combustion product may have a pressure from a low of about 150 psia, about 200 psia, or about 250 psia to a high of about 300 psia, about 350 psia, or about 400 psia. The second combustion product may then be expanded through the low-pressure expander 126, thereby reducing the pressure of the second combustion product and concurrently producing a third power output in the generator 135. In at least one embodiment, the low-pressure expander may expand the second combustion product and exhaust a second exhaust product to generate approximately 106 MW of energy in the generator 135. The second exhaust product may then flow through exhaust line 140 to the recuperator 162, wherein the heat from the second exhaust product may be transferred to the compressed process gas from the compressed gas storage unit 110. In at least one embodiment, the second exhaust product may have a pressure from a low of about 10 psia, or about 15 psia to a high of about 15 psia, or about 20 psia. For example, the second exhaust product may be at about atmospheric pressure, or about 15 psia. In one embodiment, the second exhaust product may have a temperature from a low of about 500° F., about 600° F., or about 650° F. to a high of about 700° F., about 750° F., or about 800° F.

Figure 3:
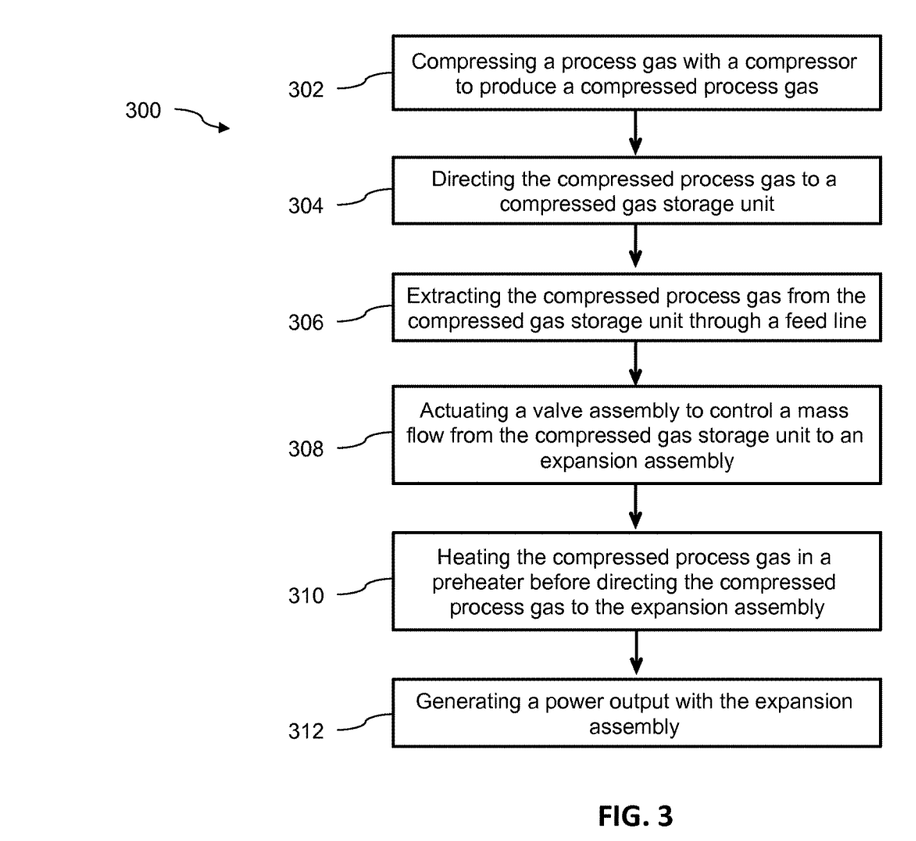
FIG. 3 depicts a flowchart of an illustrative method of operating the CAES system including a dual reheat topping cycle for improved energy efficiency with high storage pressure, according to one or more embodiments described herein.

FIG. 3 depicts a flowchart of an illustrative method 300 of operating the CAES system including a dual reheat topping cycle for improved energy efficiency with high storage pressures, according to one or more embodiments described herein.

The method 300 includes compressing a process gas with a compressor train to produce a compressed process gas, as shown at 302. The method 300 also includes directing the compressed process gas to a compressed gas storage unit and storing the compressed process gas at a high pressure, as shown at 304. The method 300 also includes extracting the compressed process gas from the compressed gas storage unit through a feed line, as shown at 306. The method 300 also includes actuating a valve assembly to control a mass flow from the compressed gas storage unit to an expansion assembly, wherein the valve assembly is fluidly coupled to the feed line upstream of the expansion assembly and downstream from the compressed gas storage unit, as shown at 308. The method 300 also includes heating the compressed process gas in a preheater before directing the compressed process gas to the expansion assembly, wherein the preheater is fluidly coupled to the feed line upstream from the expansion assembly, as shown at 310.

The method 300 also includes generating a power output with the expansion assembly, wherein the expansion assembly comprises a rotor shaft, a generator coupled to the rotor shaft, an air turbine assembly and a gas turbine assembly, as shown at 312. Generating the power output with the expansion assembly, as shown at 312 may include controlling a total mass flow of compressed process gas from the compressed gas storage unit to a gas turbine assembly. Controlling the total mass flow of compressed process gas form the compressed gas storage unit to the gas turbine assembly may include actuating a bypass control valve to control a mass flow through the air turbine assembly and a bypass line.

The CAES system 100 described may provide a method to selectively operate the CAES system 100 in one or more of the following modes of operation:

An excess pressure mode, wherein a compressed gas storage pressure is above the designed pressure for the air turbine assembly 138. The excess pressure mode may include actuating the bypass control valve 155 to allow all or substantially all the mass flow to pass through the air turbine assembly 138 to generate a first power output. The excess pressure mode may also include throttling the compressed process gas to within the maximum designed limit of the gas turbine assembly 139.

A reduced pressure mode, wherein the compressed gas storage pressure is below the designed pressure for the air turbine assembly 138, but above the designed inlet pressure for the gas turbine assembly 139. The reduced pressure mode may include actuating the bypass control valve 155 to allow a portion of mass flow therethrough, thereby regulating the inlet pressure for the gas turbine assembly 139 to the designed inlet pressure for the gas turbine assembly 139. In at least one embodiment, the mass flow through the air turbine assembly 138 may be greater than the mass flow through the bypass control valve 155 during the reduced pressure mode.

A compressor train mode, wherein compressed process gas is provided only by the compressor train. The compressor train mode may include actuating the bypass control valve 155 to allow all or substantially all the compressed process gas to flow therethrough, thereby bypassing the air turbine assembly 138. In at least one embodiment, bypassing the air turbine assembly 138 when compressed process gas is provided by the compressor train 104 may minimize the amount of power required for the compressor train 104, thereby increasing the total power output. For example, bypassing the air turbine assembly 138 may increase total power output by about 15%, about 20%, or about 25%. In another embodiment, bypassing the air turbine assembly 138 when compressed process gas is provided by the compressor train 104, reduces the energy cost to operate the expansion assembly 120. The reduction in the energy cost to operate the expansion assembly 120 may be provided by the reduction in the energy and/or power requirements for the compressor train 104.

A startup and synchronization mode. The startup and synchronization mode may include actuating the bypass control valve 155 to allow all or substantially all the mass flow therethrough. Allowing all or substantially all the mass flow to bypass the air turbine assembly 138 may increase airflow to the expanders 124, 126 of the gas turbine assembly 139. Allowing all or substantially all of the mass flow to bypass the air turbine assembly 138 may reduce the output of the gas turbine assembly 139. Reducing the output of the gas turbine assembly 139 may facilitate speed control during startup and/or synchronization mode.

In at least one embodiment, operating the CAES system 100 may include providing at least a minimum pressure differential across the air turbine assembly 138 during all modes of operation. Providing the minimum pressure differential across the air turbine assembly 138 may cool the components of the air turbine assembly 138. For example, when the air turbine assembly 138 and the gas turbine assembly 139 are coupled to a common rotor shaft 123, the expanders 122, 124, 126 of the air turbine assembly 138 and the gas turbine assembly 139 will have the same rotational speed. Thus, during one or more modes of operating the CAES system when all or substantially all the compressed process gas is directed through the bypass control line 155, one or more flow paths of the air expander 122 may become heated. In actuating the bypass control valve 155 to provide a minimum pressure differential across the air expander 122, the heat generated in the flow path from the rotational speed of the air turbine assembly 138 may be reduced.

A control system 200 may be provided in operative connection with the CAES system 100 to monitor and control the described components, systems, assemblies, and/or operating parameters. In one or more embodiments, the control system 200 may include the following features, functions and operations: automated unmanned operation under a dedicated control system; local and remote human machine interfacing capabilities for data access, data acquisition, unit health monitoring and operation; controlled start-up, operation and shutdown in the case of a failure event; fully automated start/stop, alarm, shut-down, process adjustment, ambient temperature adjustment, data acquisition and synchronization; control and power management system designed for interfacing with an external distributed plant control system.

The control system 200 may be communicably coupled to the valve assembly 130, the bypass control valve 155, the compressor train 104, the preheater 160, the air expansion train 120, the air turbine assembly 138, the gas turbine assembly 139, the emission abatement system 190, and/or the water injection skid 170. The control system 200 may be communicably coupled through any suitable means including but not limited to wired connections, and/or wireless connections. In one or more embodiments, the control system 200 may be configured to actuate, adjust, manipulate, and/or otherwise control one or more parts of the CAES system 100. The control system 200 may also be configured to monitor one or more parameters and/or variables of the compressed process gas within the CAES system 100 including, but not limited to pressure, temperature, and/or mass flow.

In one or more embodiments, the control system 200 may include a computer system 202 with a multi-controller algorithm configured to monitor, actuate, adjust, manipulate, and/or otherwise control one or more parts of the CAES system 100. The control system 200 may also be configured to implement one or more method or process for the CAES system 100 including, but not limited to a speed/frequency control mode, a load control mode, the excess pressure mode, the reduced pressure mode, the compressor train mode, and the startup and synchronization mode.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A compressed air energy storage system, comprising:
   a compressor train adapted to receive a process gas and output a compressed process gas;
   a compressed gas storage unit coupled to the compressor train and adapted to receive, store, and output the compressed process gas;
   a preheater coupled to the compressed gas storage unit through a feed line and adapted to receive the compressed process gas and heat the compressed process gas;
   an expansion assembly coupled to the preheater through the feed line and adapted to receive the compressed process gas from the preheater, the expansion assembly comprising:
   a rotor shaft;
   a generator coupled to the rotor shaft and adapted to generate a power output;
   an air turbine assembly coupled to the preheater, the air turbine assembly including one or more air expanders coupled to the rotor shaft, wherein the air expanders are adapted to expand the compressed process gas and reduce a pressure of the compressed process gas; and
   a gas turbine assembly coupled to the air turbine assembly and the preheater, adapted to receive the compressed process gas and output an exhaust gas, the gas turbine assembly including a plurality of fired expanders coupled to the rotor shaft, wherein each of the fired expanders includes a combustor;
   a valve assembly fluidly coupled to the feed line, including one or more valves and adapted to control a total mass flow of the compressed process gas from the compressed gas storage unit to the expansion assembly; and
   a bypass line including a bypass control valve, wherein the bypass line is coupled to the feed line upstream of the air turbine assembly, and
   a computer controller communicably coupled to the bypass control valve wherein the computer controller controls actuation of the bypass control valve in accordance with a pressure mode to control a mass flow of the compressed process gas through the air turbine assembly and the bypass line, regulate the total mass flow to the gas turbine assembly, and maintain a selected inlet pressure for the gas turbine assembly.

2. The system of claim 1, wherein the preheater includes a recuperator fluidly coupled to the gas turbine assembly and adapted to receive the exhaust gas from the gas turbine assembly and transfer heat from the exhaust gas to the compressed process gas therein.

3. The system of claim 2, wherein the preheater further includes a standby heater.

4. The system of claim 2, further comprising an emission abatement system, coupled to the recuperator.

5. The system of claim 1, wherein the valve assembly includes a first valve fluidly coupled to the feed line upstream of a second valve.

6. The system of claim 5, wherein the first valve is an emergency trip valve and the second valve is a motive air control valve.

7. The system of claim 1, wherein the air turbine assembly includes one air expander having a plurality of stages, wherein each of the plurality of stages includes an inlet fluidly coupled to the feed line.

8. The system of claim 1, wherein the compressed gas storage unit is a cavern, wherein the cavern requires a storage pressure that exceeds 2000 psia.

9. The system of claim 1, further comprising a water injection skid adapted to introduce water to the combustor of each fired expander.

* * * * *